United States Patent [19]

Butler et al.

[11] Patent Number: 5,089,197
[45] Date of Patent: Feb. 18, 1992

[54] MANUFACTURE OF SHAPED ARTICLES FROM SINTERABLE POWDER

[75] Inventors: Nicholas D. Butler; John Woodthrope, both of Rugby, United Kingdom; Francisco C. Fernandez; Inigo I. Zubillaga, both of San Sebastian, Spain

[73] Assignee: T & N Technology, Warwickshire, England

[21] Appl. No.: 617,092

[22] Filed: Nov. 23, 1990

[30] Foreign Application Priority Data

Nov. 23, 1989 [GB] United Kingdom ............... 8926455

[51] Int. Cl.$^5$ .............................................. C04B 35/64
[52] U.S. Cl. ....................................... 264/65; 264/56
[58] Field of Search ................. 264/56, 65, 125, 332

[56] References Cited

U.S. PATENT DOCUMENTS

| | | | |
|---|---|---|---|
| 4,023,966 | 5/1977 | Loersch et al. | 264/56 X |
| 4,112,143 | 9/1978 | Adlerborn et al. | 427/191 |
| 4,256,688 | 5/1981 | Adlerborn et al. | 264/325 |
| 4,446,100 | 5/1984 | Adlerborn et al. | 419/48 |
| 4,455,275 | 6/1984 | Adlerborn et al. | 264/325 |
| 4,462,818 | 7/1984 | Wolfe et al. | 65/36 |
| 4,478,789 | 10/1984 | Adlerborn et al. | 419/49 |
| 4,495,123 | 1/1985 | Hunold et al. | 264/69 |
| 4,505,871 | 3/1985 | Adlerborn et al. | 264/325 |
| 4,552,710 | 11/1985 | Rigby et al. | 264/64 |
| 4,560,668 | 12/1985 | Hunold et al. | 501/92 |
| 4,568,516 | 2/1986 | Adlerborn et al. | 419/26 |
| 4,612,146 | 9/1986 | Huther | 264/29.6 |
| 4,692,288 | 9/1987 | Rossmann et al. | 264/56 |
| 4,717,535 | 1/1988 | Adlerborn et al. | 419/38 |
| 4,744,943 | 5/1988 | Timm | 419/10 |
| 4,778,650 | 10/1988 | Hermansson et al. | 419/38 |
| 4,812,272 | 3/1989 | Heinrich et al. | 264/65 |

FOREIGN PATENT DOCUMENTS

| | | |
|---|---|---|
| 0061988 | 10/1982 | European Pat. Off. . |
| 0084369 | 7/1983 | European Pat. Off. . |
| 0245812 | 11/1987 | European Pat. Off. . |
| 0320927 | 6/1989 | European Pat. Off. . |
| 1300864 | 12/1972 | United Kingdom . |

OTHER PUBLICATIONS

Patent Abstracts of Japan, vol. 12, No. 312 (C-523) [3159].
World Patent Index, accession No. 89-367722 [50].

Primary Examiner—Mary Lynn Theisen
Attorney, Agent, or Firm—Nixon & Vanderhye

[57] ABSTRACT

It is known to obtain from a sinterable powder (e.g., of silicon nitride+metallic oxide sintering aid) a shaped article with at least 95% theoretical density, by the hot isostatic pressing of a preshaped body of the powder while that body is encapsulated in a gas-impermeable capsule which is plastic at the temperature of the hot gas by which the isostatic pressure is applied. Until now, a pressure of the order of 100 MPa has been treated as the practical minimum necessary for hot isostatic pressing. By the invention, a pressure less than 20 MPa is used, in conjunction with a degassing of the preshaped body, carried out prior to encapsulation, as in a vacuum whose pressure is no more than a few mm of mercury, and preferably less than 1 mm (approximately equal to 0.15 kPa).

6 Claims, No Drawings

MANUFACTURE OF SHAPED ARTICLES FROM SINTERABLE POWDER

This invention relates to the manufacture of shaped articles from sinterable powder.

The manufacture of shaped articles from sinterable powders, e.g. of ceramic material or metal, is well known. With powders that are difficult to sinter, such as nitrides (e.g. silicon nitride, aluminium nitride, sialons, titanium nitride, zirconium nitride), carbides (e.g. silicon carbide, boron carbide, titanium carbide), borides (e.g. titanium boride, zirconium boride) and oxides (e.g. aluminium oxide, zirconium oxide), special methods have been developed in order to obtain sintered products with a high relative density and a high flexural strength at elevated temperatures. Generally speaking, the desired density is at least 95% of "theoretical density", a concept with which those in the art are very familiar.

A sintered product of such density can be obtained by the hot isostatic pressing of a preshaped body of the powder while that body is encapsulated in a gas-impermeable capsule (e.g. of high-melting glass) which is plastic at the temperature of the hot gas by which the isostatic pressure is applied. The patent literature contains several disclosures of such a method, from which it sometimes appears to be implied (as by reference to a range of pressures) that the isostatic pressure which is applied for sintering may be about 50 MPa. Thus, for the isostatic hot pressing of boron nitride powder in an evacuated vacuum-tight casing, U.S. Pat. No. 4,495,123 published 1985 refers in its summary to the use of a pressure "from about 50 to 300 MPa" at a temperature of from about 1200° C. to 1500° C.; but what the patent states in its detailed description is that "the pressure applied lies preferably within the range of from about 100 to about 200 MPa."

EP-A-0 245 812 published November 1987 more plainly states:

"The pressure and the temperature for the isostatic pressing and the sintering of a ceramic or metallic material are, of course, dependent on the type of this material. Normally, however, the pressure should amount to at least 100 MPa and the temperature to at least 1000° C."

It is accepted that the use of such high pressures causes considerable problems in manufacture, and requires the use of equipment of high capital cost.

The present invention has arisen from our discovery that preshaped bodies of sinterable powder prepared for hot isostatic pressing have an extraordinary ability to retain gas or vapour adsorbed on the particles composing them; that this adsorbed material is only partially removed by ordinary "evacuation" procedures, even at temperatures of 600°-700° C.; and that it is the retained gas, water vapour or the like which prevents the attainment of densities approaching the theoretical when hot isostatic pressing is carried out at pressures significantly below 100 MPa. The gas-retaining capacity just referred to, and its deleterious effects, are illustrated in comparative Examples 2 and 3 later in this specification.

We have now found that if the preshaped body is degassed—that is to say, if before encapsulation it is exposed to a vacuum whose pressure is no more than a few mm of mercury, the exposure being at an elevated temperature and for an extended time (not readily definable numerically, but related to the actual pressure of the vacuum and the temperature of the preshaped body during exposure to it)—then hot isostatic pressing can be carried out at pressures below 20 MPa to obtain a sintered product with the desired high density.

In accordance with the invention, therefore, there is provided a method of making from a sinterable powder a shaped article with at least 95% theoretical density, by the hot isostatic pressing of a preshaped body of the powder while that body is encapsulated in a capsule which is plastic at the temperature of the hot gas by which the isostatic pressure is applied but which is impermeable to the hot gas, characterised in that, before encapsulation, the preshaped body is degassed, by exposing it to a vacuum whose pressure is no more than a few mm of mercury, and the subsequent hot isostatic pressing is carried out at a pressure below 20 MPa.

Preferably, the vacuum pressure employed for degassing is less than 1 mm of mercury. It is further preferred that exposure to vacuum should include a period of at least 15 minutes at 900° C. or higher.

As demonstrated by Example 1 which follows later, the hot isostatic pressing can be carried out at a pressure below 15 MPa.

The method of the invention can be applied to the sintering of ceramic powders, such as the nitrides (particularly silicon nitride), carbides, borides, and oxides listed earlier. It is specially useful in sintering silicon nitride admixed with a metallic oxide sintering aid, particularly a rare earth oxide, such as yttria ($Y_2O_3$). Preferably, the metallic oxide sintering aid forms no more than 10% by weight of the powder to be sintered.

The capsule employed to enclose the preshaped body of sinterable powder is preferably of a high-melting glass, and may be a preformed one into which the preshaped body is inserted and sealed up in vacuo once the system has been effectively degassed. Preferably, however, the preshaped body is encapsulated by first coating it with a powder (e.g. glass powder surrounding the body) fusible to form the plastic capsule, degassing the preshaped body and its associated powder coating, and then fusing the powder to form the plastic capsule.

Preferably, as in EP-A-0 245 812 already cited, a barrier layer comprising powdered boron nitride is present between the preshaped body and the glass capsule.

The invention is further illustrated by Example 1 following, which relates to the sintering of silicon nitride ($Si_3N_4$) powder admixed with a rare earth metal oxide as sintering aid.

EXAMPLE 1

Silicon nitride powder (sub-micron size particles) of surface area 10–14 $m^2/g$ mixed with 5% by weight of yttrium oxide was ball-milled in isopropanol with silicon nitride media for 16 hours. Binder (polyethyleneglycol, M.Wt 4000) in an amount forming 3% by weight of the milled solids was added, and isopropanol was distilled off. The dry residue was rubbed through a sieve, and isostatically pressed (30,000 psi; approximately equal to 200 MPa) at ambient temperature into a compact of a desired shape. This was heated in air to 400° C. to burn off the binder.

The compact was then coated with boron nitride powder to prevent reaction at its surface with glass at a later stage. The boron nitride powder (average particle size, 5 $\mu$m) was mixed with ethanol to form a viscous slurry, and this was brushed onto the surface of the compact to form a layer at least 2 mm thick. To avoid loss of the boron nitride layer the compact was not allowed to dry out, but—with the layer still moist—was embedded in the ground glass powder which was to be fused into a capsule enveloping it. The powder was of the high-silica (96%) glass available under the Registered Trade Mark VYCOR, Code 7913, ground to pass a sieve of aperture 150 μm, and was contained in a crucible (of fused boron nitride or graphite lined with boron nitride powder) rectangular in horizontal section and with downwardly tapering walls. The glass powder was pressed down to form a firm layer in the bottom of the crucible, and the coated compact of $Si_3N_4+Y_2O_3$ was laid on the base layer away from the crucible sidewalls. Glass powder was then pressed around and above the compact.

The crucible with contents was put in a furnace, which was then evacuated to a gas pressure of $10^{-1}$–$10^{-2}$ Torr (=0.1–0.01 mm of mercury; approximately equal to 0.01–0.001 kPa). The crucible was heated at 10° C./minute to 400° C., held at that temperature for 15 minutes, then heated at 10° C./minute to 900° C. and held there for 15 minutes. The heating rate was then reduced to 5° C./minute, and heating was continued up to 1470° C., with a pause (hold) at intermediate temperatures whenever the pressure in the furnace rose above 0.2 mm of mercury. This completed the degassing operation. After holding at 1470° C. for 15 minutes to fuse the glass powder into a continuous capsule enclosing the BN-coated silicon nitride compact, nitrogen was admitted to the furnace at 0.2 MPa/minute to attain a pressure of 0.5 MPa, and the crucible was then heated at 5° C./minute to 1500° C. and held at that temperature for 15 minutes while maintaining the gas pressure at 0.5 MPa. This consolidated the glass capsule.

The crucible with contents was then heated further, first to 1500° C. at 10° C./minute and pressure 0.5 MPa of nitrogen, then to 1800° C. at 10° C./minute with increase of the pressure to 10 MPa of nitrogen, to sinter the compact. These conditions were maintained for 3 hours. The furnace was then allowed to cool, and the capsule with contents was removed. The capsule was then cut, and the sintered compact was withdrawn from it. The compact was found to have a density of 3.22 g/cm³, which is greater than 99% of theoretical.

In a procedure essentially similar to that of the above Example, with a starting mix composed (by weight) of $Si_3N_4$ (90%), $Y_2O_3$ (7.5%) and added $SiO_2$ (2.5%), the product had a density of 3.21 g/cm³—again, more than 99% of theoretical.

The following comparative Examples illustrate what happens when the preshaped body is subjected to a vacuum treatment that falls short of degassing.

EXAMPLE 2

A coated silicon nitride compact produced following generally the procedure set out in Example 1 was inserted into a tube of VYCOR glass sealed at one end. The other (2nd) end of the tube was then connected to a vacuum pump, and the system was evacuated at room temperature to a pressure below 0.01 kPa (=0.1 mm of mercury). The tube was then flame-sealed at the 2nd end, and the resulting capsule with contents was subjected in an HIP furnace to the regime of Example 1.

At about 1000° C., the capsule exploded owing to the generation of pressure by release of adsorbed gas from the enclosed silicon nitride.

EXAMPLE 3

The procedure of Example 2 was followed with the difference that evacuation of the system to 0.01 kPa was carried out at 600° C. Then, the regime of Example 1 was followed, concluding with the step of sintering for 3 hours under an isostatic pressure of 10 MPa at 1800° C. This resulted in a densified product, but the density produced was at most 2.93 g/cm³ (90% of theoretical) and on one occasion was as low as 2.65 g/cm³ (82% of theoretical).

By contrast, following a conventional regime (in particular with isostatic pressure at 160 MPa at 1750° C. for 1 hour) after evacuation to 0.01 kPa at 600° C., yielded a product of more than 99% theoretical density.

We claim:

1. A method of making from a sinterable silicon nitride powder admixed with a metallic oxide sintering aid a shaped article with at least 95% theoretical density, by the hot isostatic pressing of a preshaped body of the powder while that body is encapsulated in a capsule which is plastic at the temperature of the hot gas by which the isostatic pressure is applied but which is impermeable to the hot gas, the method comprising the steps of (a) degassing the preshaped body before encapsulation by exposing it to a vacuum whose pressure is less than 1 mm of mercury, the exposure being at a temperature exceeding 600° C. and for a time such as to enable the formation on application of an isostatic pressure below 20 MPa, of a silicon nitride article of increased density, said density being at least 95% of theoretical density; and (b) subsequently hot isostatic pressing the encapsulated body at a pressure below 20 MPa.

2. A method according to claim 1, in which the hot isostatic pressing is carried out at a pressure below 15 MPa.

3. A method according to claim 1, in which the metallic oxide is a rare earth oxide.

4. A method according to claim 1, in which said metallic oxide sintering aid forms no more than 10% by weight of the powder.

5. A method according to claim 1, in which the capsule is of glass.

6. A method according to claim 5, in which the glass capsule is formed about the preshaped body from glass powder surrounding it.

* * * * *